United States Patent
Sugimura et al.

(10) Patent No.: US 11,300,412 B2
(45) Date of Patent: *Apr. 12, 2022

(54) INFORMATION PROCESSING DEVICE, NON-TRANSITORY COMPUTER READABLE STORAGE MEDIUM STORING PROGRAM AND SMALL SIZE VEHICLE

(71) Applicant: TOYOTA JIDOSHA KABUSHIKI KAISHA, Toyota (JP)

(72) Inventors: Tae Sugimura, Miyoshi (JP); Hirotaka Karube, Toyota (JP); Kazuki Matsumoto, Ohgaki (JP); Makoto Mori, Nagakute (JP); Jun Kondo, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 244 days.

This patent is subject to a terminal disclaimer.

(21) Appl. No.: 16/535,641

(22) Filed: Aug. 8, 2019

(65) Prior Publication Data
US 2020/0116490 A1    Apr. 16, 2020

(30) Foreign Application Priority Data
Oct. 11, 2018    (JP) .............................. JP2018-192261

(51) Int. Cl.
*G01C 21/20*    (2006.01)
(52) U.S. Cl.
CPC ................................. *G01C 21/20* (2013.01)

(58) Field of Classification Search
CPC .... G01C 21/20; G01C 21/32; G01C 21/3461; G01C 21/3423; G01C 21/005;
(Continued)

(56) References Cited

U.S. PATENT DOCUMENTS 9,429,947 B1    8/2016 Wengreen et al.
2011/0144850 A1    6/2011 Jikihara
(Continued)

FOREIGN PATENT DOCUMENTS

JP    2007-087287 A    4/2007
JP    4687618 B2    5/2011
(Continued)

OTHER PUBLICATIONS

Toyota Motor Corporation, Passable Route Map, [Online], Mar. 17, 2011, Toyota Motor Corpoartion, [Retrieved Oct. 11, 2018], Internet <https://www.toyota.co.jp/jpn/auto/passable_route/map/>.
(Continued)

*Primary Examiner* — Brian P Sweeney
(74) *Attorney, Agent, or Firm* — Oliff PLC

(57) ABSTRACT

An information processing device includes: a receiver configured to receive an emergency signal indicating occurrence of a disaster; an acquisition unit configured to acquire traveling data from a predetermined small size vehicle in a case where the emergency signal is received; and a generation unit configured to generate map information indicating passable route passable for a person based on the traveling data, the passable route including a route including a place other than an existing road.

4 Claims, 13 Drawing Sheets

(58) Field of Classification Search
CPC .......... H04W 4/44; H04W 4/90; G08B 7/066; G08B 21/10; G01V 1/008; B62K 11/007
See application file for complete search history.

(56) References Cited

U.S. PATENT DOCUMENTS

| | | |
|---|---|---|
| 2015/0046018 A1 | 2/2015 | Hayashi et al. |
| 2015/0345961 A1 | 12/2015 | Oooka et al. |
| 2015/0345964 A1 | 12/2015 | Oooka et al. |
| 2016/0282874 A1 | 9/2016 | Kurata et al. |
| 2019/0025838 A1 | 1/2019 | Artes et al. |
| 2019/0146520 A1 | 5/2019 | Naithani et al. |
| 2019/0212754 A1 | 7/2019 | Smith |
| 2020/0047343 A1 | 2/2020 | Bal et al. |

FOREIGN PATENT DOCUMENTS

| | | |
|---|---|---|
| JP | 2011-209809 A | 10/2011 |
| JP | 5325865 B2 * | 10/2013 |
| JP | 2019-028978 A | 2/2019 |
| JP | 2019-049443 A | 3/2019 |
| WO | 2017/079777 A2 | 6/2017 |

OTHER PUBLICATIONS

May 13, 2021 Office Action issued in U.S. Appl. No. 16/513,918.
Aug. 2, 2021 Office Action issued in U.S. Appl. No. 16/513,918.
Dec. 10, 2021 Office Action issued in U.S. Appl. No. 16/513,918.

* cited by examiner

INFORMATION PROCESSING DEVICE, NON-TRANSITORY COMPUTER READABLE STORAGE MEDIUM STORING PROGRAM AND SMALL SIZE VEHICLE

INCORPORATION BY REFERENCE

The disclosure of Japanese Patent Application No. 2018-192261 filed on Oct. 11, 2018 including the specification, drawings and abstract is incorporated herein by reference in its entirety.

BACKGROUND

1. Technical Field

The disclosure relates to an information processing device, a non-transitory computer readable storage medium storing a program, and a small size vehicle.

2. Description of Related Art

A system that supports a vehicle bypass route based on probe data of a four-wheel vehicle and a two-wheel vehicle at the time of a disaster has been developed (for example, Japanese Unexamined Patent Application Publication No. 2011-209809 (JP 2011-209809 A)). In addition, a system that updates traffic result information of a vehicle on a contract each time a predetermined time elapses and supports movement in a disaster region has been developed (TOYOTA MOTOR CORPORATION, "Passable Route Map", [Online], Mar. 17, 2011, TOYOTA MOTOR CORPORATION, [Retrieved Oct. 11, 2018], Internet <https://www.toyota.co.jp/jpn/auto/passable_route/map/>).

SUMMARY

In a case where a person evacuates, when there is a space passable for the person other than an existing road, the person may evacuate to a safe place through the space. Therefore, it is desired to create a map indicating information on a route passable for a human in addition to a map of a route passable for a vehicle.

The disclosure provides an information processing device capable of generating map information indicating a route passable for a person, a non-transitory computer readable storage medium storing a program, and a small size vehicle.

A first aspect of the disclosure relates to an information processing device including a receiver, an acquisition unit, and a generation unit. The receiver is configured to receive an emergency signal indicating occurrence of a disaster. The acquisition unit is configured to acquire traveling data from a predetermined small size vehicle in a case where the emergency signal is received The generation unit is configured to generate map information indicating passable route passable for a person based on the traveling data, the passable route including a route including a place other than an existing road.

In the information processing device according to the first aspect of the disclosure, the generation unit may be configured to specify a disaster area based on the emergency signal and to generate the map information by using the traveling data from the small size vehicle present in the disaster area.

In the information processing device according to the first aspect of the disclosure, the generation unit may be configured to update the passable route in the disaster area each time the traveling data is acquired from the small size vehicle.

In the information processing device according to the first aspect of the disclosure, the generation unit may be configured to generate the map information such that a first passable route based on traveling data of a first small size vehicle and a second passable route based on traveling data of a second small size vehicle different from the first small size vehicle are distinguishable from each other in a case where the small size vehicles include the first small size vehicle and the second small size vehicle.

A second aspect of the disclosure relates to a non-transitory computer readable storage medium storing a program. The program cause a computer to: receive an emergency signal indicating occurrence of a disaster and acquiring traveling data from a predetermined small size vehicle in a case where the emergency signal is received; and generate map information indicating passable route passable for a person based on the traveling data, the passable route including a route including a place other than an existing road.

A third aspect of the disclosure relates to a small size vehicle including a receiver, an acquisition unit, and a generation unit. The receiver is configured to receive an emergency signal indicating occurrence of a disaster. The acquisition unit is configured to acquire non-host vehicle traveling data from another small size vehicle in a case where the emergency signal is received. The generation unit is configured to generate map information indicating passable route passable for a person based on host vehicle traveling data and the non-host vehicle traveling data, the passable route including a route including a place other than an existing road.

According to the aspects of the disclosure, it is possible to generate map information indicating a route passable for a person.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
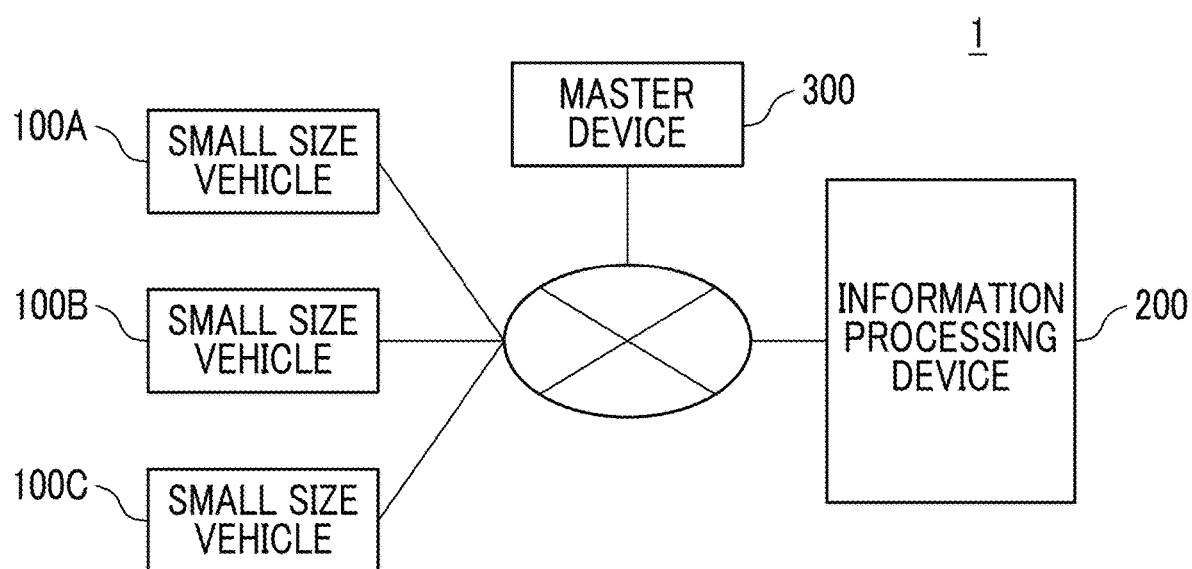
FIG. 1 is a diagram illustrating a schematic configuration of a route management system according to an embodiment.

Hereinafter, an embodiment of the disclosure will be described in detail with reference to drawings. Note that, the same elements will be given the same reference numerals and repetitive description will be omitted.

According to the present embodiment, it is possible to generate passable routes passable for a person by obtaining traveling data from small size vehicles at the time of a disaster, the small size vehicles including an inverted type mobile object which travels on a road or a personal type mobile object for one person or two persons. The passable routes include a space such as a vacant lot or a park that is passable for a small size vehicle, in addition to an existing road.

Configuration of System

FIG. 1 is a diagram illustrating a schematic configuration of a route management system 1 according to the present embodiment. As shown in FIG. 1, the route management system 1 includes a small size vehicle 100A, a small size vehicle 100B, a small size vehicle 100C, an information processing device 200, and a master device 300. In addition, all or a portion of the above-described devices are connected to each other via a communication network such that communication therebetween can be performed. The communication network may be any of the Internet, a local area network (LAN), a mobile communication network, Bluetooth (registered trademark), Wireless Fidelity (WiFi), another communication line, a combination thereof, or the like. Note that, the number of small size vehicles (for example, personal mobility vehicles) and the number of information processing devices (for example, servers) are not limited to those in the above-described example as long as an appropriate number of small size vehicles and an appropriate number of information processing devices are provided in accordance with the size of the system. Hereinafter, the small size vehicles 100A, 100B, 100C will be simply referred to as "small size vehicles 100" when the small size vehicles 100A, 100B, 100C are collectively referred without being distinguished from each other.

The master device 300 is a device that transmits an emergency signal generated at the time of a disaster or at the time of prediction of a disaster. For example, the master device 300 predicts whether an earthquake or a seismic sea wave will occur or not based on information acquired from a sensor such as a seismometer and generates the emergency signal in a case where the master device 300 predicts that there will be significant damage.

Hardware Configuration of Information Processing Device

Figure 2:
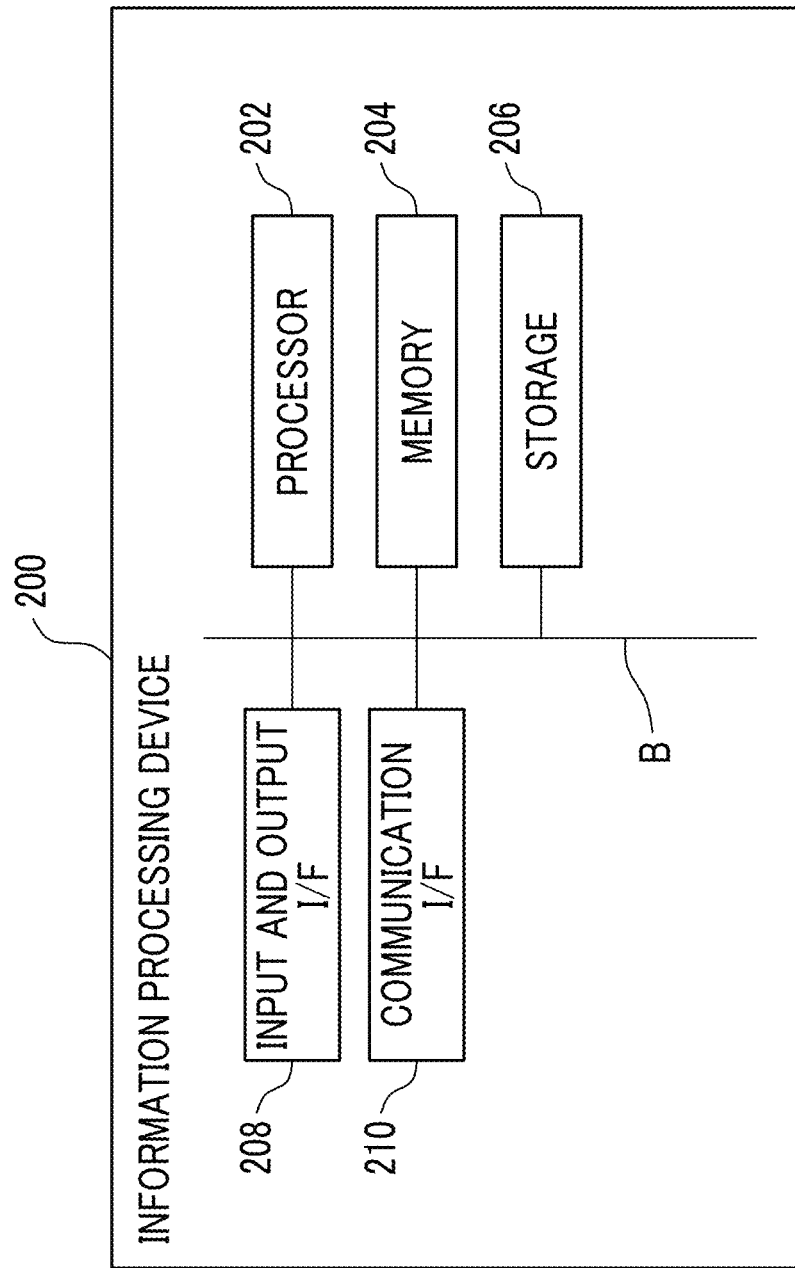
FIG. 2 is a diagram illustrating an example of a hardware configuration of an information processing device according to the embodiment.

FIG. 2 is a diagram illustrating an example of a hardware configuration of the information processing device 200 according to the present embodiment. As shown in FIG. 2, the information processing device 200 includes a processor 202, a memory 204, a storage 206, an input and output interface (input and output I/F) 208, and a communication interface (communication I/F) 210. The components of the hardware (HW) of the information processing device 200 are connected to each other via, for example, a bus B.

The information processing device 200 realizes a function and/or a method described in the present embodiment by the cooperation of the processor 202, the memory 204, the storage 206, the input and output I/F 208, and the communication I/F 210.

The processor 202 performs a function and/or a method realized by a code or a command included in a program stored in the storage 206. Examples of the processor 202 include a central processing unit (CPU), a micro processing unit (MPU), a graphics processing unit (GPU), a microprocessor, a processor core, a multiprocessor, an application-specific integrated circuit (ASIC), a field programmable gate array (FPGA), or the like.

The memory 204 temporarily stores the program loaded from the storage 206 and provides a work area for the processor 202. Various kinds of data that are generated while the processor 202 is executing the program are also temporarily stored in the memory 204. Examples of the memory 204 include a random access memory (RAM), a read only memory (ROM), or the like.

The storage 206 stores the program executed by the processor 202 or the like. Examples of the storage 206 include a hard disk drive (HDD), a solid state drive (SSD), a flash memory, or the like.

The input and output I/F 208 includes an input device used to input various operations with respect to the information processing device 200 and an output device that outputs the result of a process performed by the information processing device 200. The input and output I/F 208 also outputs the result of the process to a display device or a speaker.

The communication I/F 210 receives and transmits various kinds of data via a network. The communication may be performed in any of a wired manner and a wireless manner and any communication protocol may be used as long as the communication can be performed. The communication I/F 210 has a function of communicating with the small size vehicle 100 via the network. The communication I/F 210 transmits various kinds of data to another information processing device or the small size vehicle 100 in accordance with an instruction from the processor 202. Note that, a hardware configuration of the master device 300 is the same as the hardware configuration of the information processing device 200.

The program in the present embodiment may be provided in a state of being stored in a computer-readable storage medium. The storage medium can store the program in a "non-temporary tangible medium". The program includes, for example, a software program or a computer program.

At least a portion of the process in the information processing device 200 may be realized by means of cloud computing established by one or more computers. A configuration in which at least a portion of the process in the information processing device 200 is performed by another information processing device may also be adopted. In this case, a configuration in which at least a portion of a process of each functional unit realized by the processor 202 is performed by another information processing device may also be adopted.

Configuration of Inverted Type Mobile Object

Figure 3:
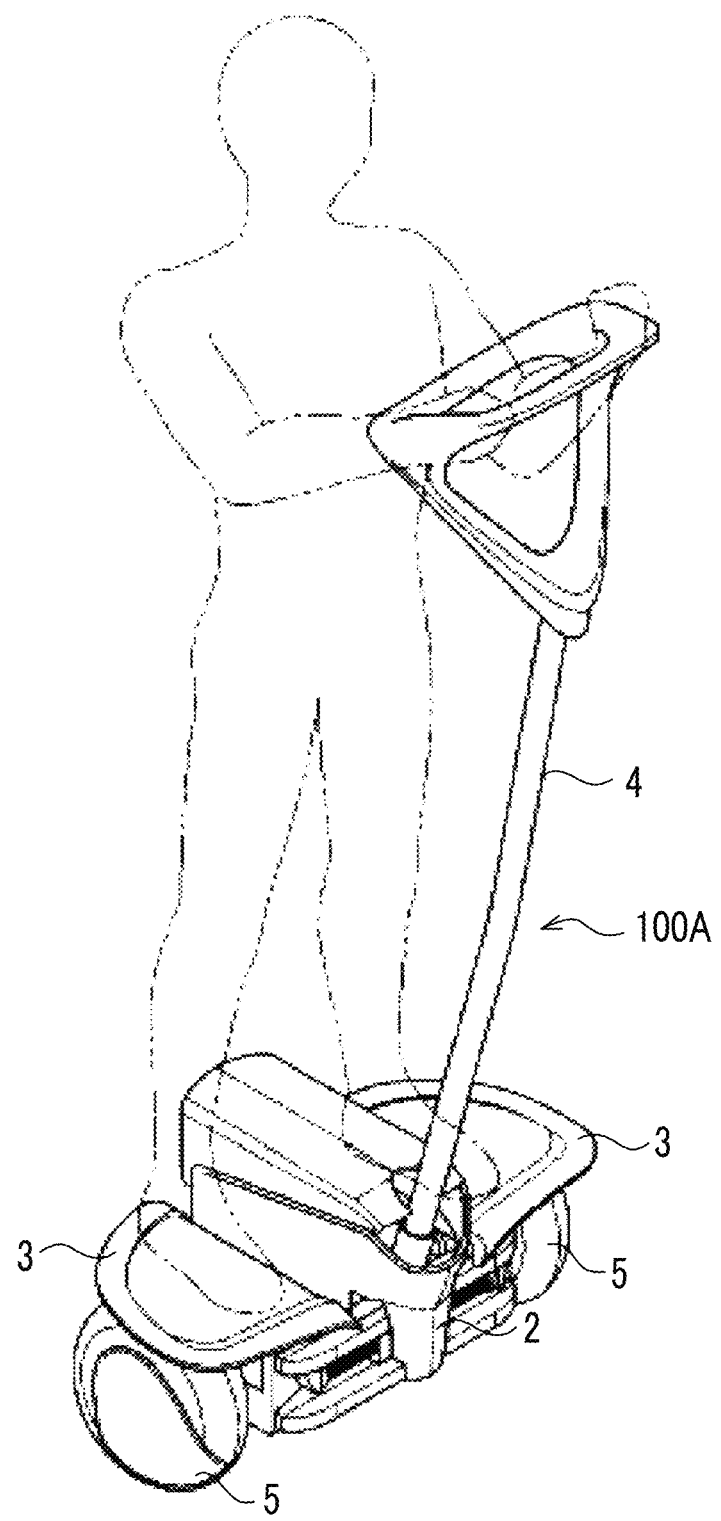
FIG. 3 is a perspective view illustrating a schematic configuration of an inverted type mobile object according to the embodiment.

FIG. 3 is a perspective view illustrating a schematic configuration of an inverted type mobile object according to the present embodiment. An inverted type mobile object 100A according to the present embodiment is provided with, for example, a vehicle main body 2, a pair of right and left step portions 3 that is attached to the vehicle main body 2 and that an occupant steps on, an operation handle 4 that is tiltably attached to the vehicle main body 2 and that the occupant holds, and a pair of right and left drive wheels 5 that is rotatably attached to the vehicle main body 2.

The inverted type mobile object 100A according to the present embodiment is configured as a coaxial two-wheel vehicle of which the drive wheels 5 are disposed to be coaxial with each other and which travels while maintaining an inverted state, for example. The inverted type mobile object 100A is configured to move forward and backward when the centroid of the occupant is moved forward and backward such that the step portions 3 of the vehicle main body 2 are inclined forward and backward and is configured to turn right and left when the centroid of the occupant is moved rightward and leftward such that the step portions 3 of the vehicle main body 2 are inclined rightward and leftward. Note that, as the inverted type mobile object 100A, the coaxial two-wheel vehicle as described above is applied. However, the disclosure is not limited thereto and can be applied to any mobile object that travels while maintaining an inverted state.

Figure 4:
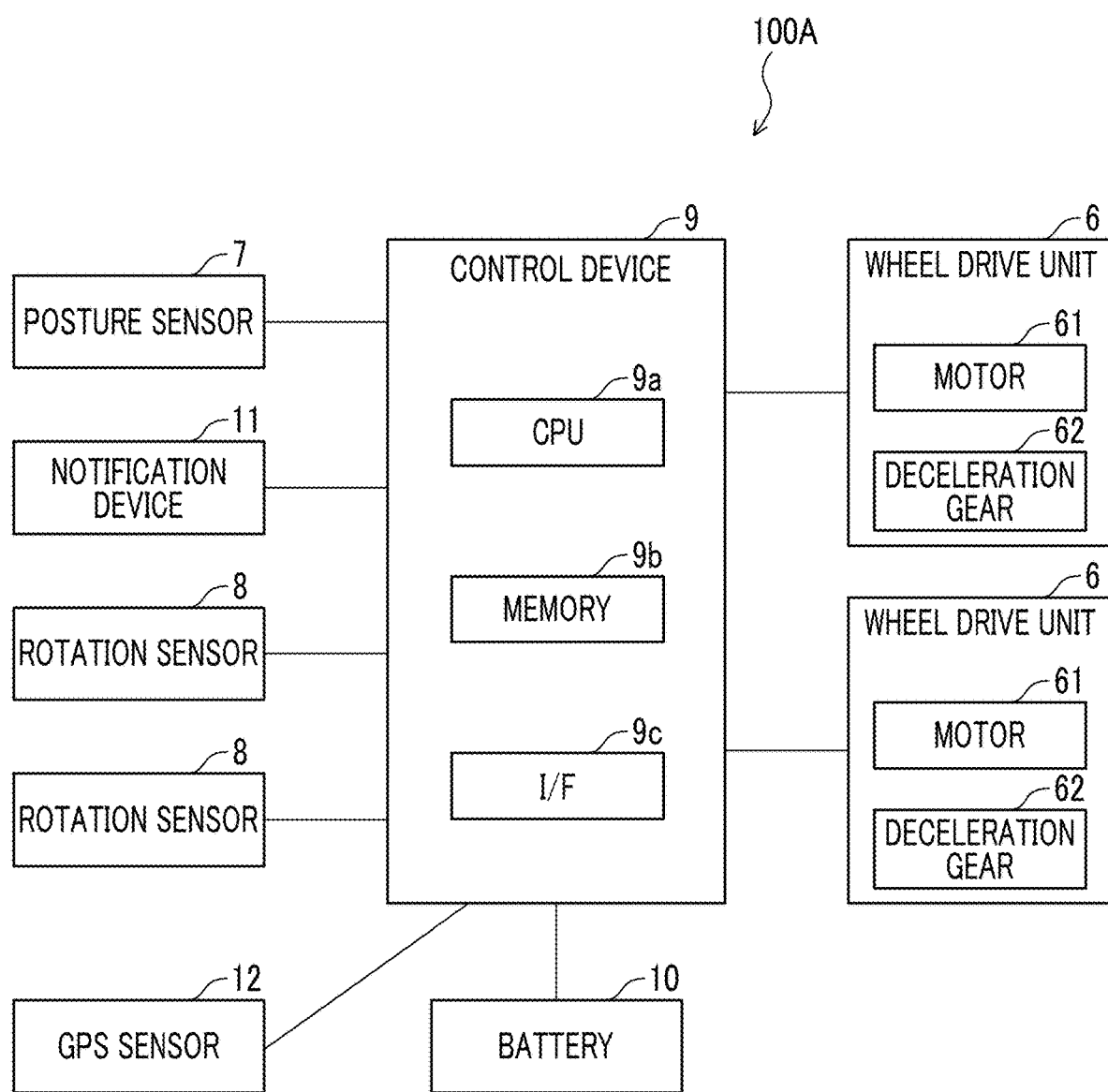
FIG. 4 is a block diagram illustrating a schematic system configuration of the inverted type mobile object according to the embodiment.

FIG. 4 is a block diagram illustrating a schematic system configuration of the inverted type mobile object according to the present embodiment. The inverted type mobile object 100A according to the present embodiment is provided with a pair of wheel drive units 6 that drives the drive wheels 5, a posture sensor 7 that detects the posture of the vehicle main body 2, a pair of rotation sensors 8 that detects rotation information of the drive wheels 5, a control device 9 that controls the wheel drive units 6, a battery 10 that supplies electrical power to the wheel drive units 6 and the control device 9, a notification device 11 that can output a sound, a global positioning system (GPS) sensor 12 that senses position information.

The wheel drive units 6 are built into the vehicle main body 2 and drive the right and left drive wheels 5, respectively. The wheel drive units 6 can drive the drive wheels 5 to rotate independently of each other. Each of the wheel drive units 6 can be configured to include a motor 61 and a deceleration gear 62 that is coupled to a rotation shaft of the motor 61 such that a motive power can be transmitted.

The posture sensor 7 is provided in the vehicle main body 2 and detects and outputs posture information of the vehicle main body 2, the operation handle 4, or the like. The posture sensor 7 detects the posture information at the time of the traveling of the inverted type mobile object 100A and is configured to include a gyro sensor, an acceleration sensor, or the like. When the occupant inclines the operation handle 4 forward or backward, the step portions 3 are inclined in the same direction as the operation handle 4 and the posture sensor 7 detects posture information corresponding to the inclination. The posture sensor 7 outputs the detected posture information to the control device 9.

The rotation sensors 8 are provided in the drive wheels 5 respectively and can detect rotation information such as the rotation angles, the rotary angular velocities, and the rotary angular accelerations of the drive wheels 5. Each of the rotation sensors 8 is configured to include, for example, a rotary encoder, a resolver, and the like. The rotation sensors 8 output the detected rotation information to the control device 9.

The battery 10 is built into the vehicle main body 2 and is a lithium ion battery, for example. The battery 10 supplies electrical power to the wheel drive units 6, the control device 9, and other electronic devices.

The control device 9 generates and outputs a control signal for driving and controlling the wheel drive units 6 based on detection values output from the various sensors built into the inverted type mobile object. For example, the control device 9 performs a predetermined calculation process based on the posture information output from the posture sensor 7, the rotation information of the drive wheels 5 output from the rotation sensors 8 and outputs the control signals to the wheel drive units 6 as needed. The control device 9 controls the wheel drive units 6 to perform inversion control such that the inverted state of the inverted type mobile object 100A is maintained.

In order to realize the above-described process, the control device 9 includes a CPU 9a, a memory 9b, and an I/F 9c. The CPU 9a performs a function and/or a method realized by a code or a command included in a program stored in the memory 9b.

The memory 9b stores the program and provides a work area for the CPU 9a. Various kinds of data that are generated while the CPU 9a is executing the program are also temporarily stored in the memory 9b. Examples of the memory 9b include a random access memory (RAM), a read only memory (ROM), or the like.

The I/F 9c includes an input device used to input various operations with respect to the control device 9 and an output device that outputs the result of a process performed by the control device 9.

The notification device 11 is a specific example of notification means. The notification device 11 performs notification with respect to the occupant or a person on the outside of the vehicle in accordance with a notification signal from the control device 9. The notification device 11 is configured to include a speaker, which outputs a sound, or the like.

The GPS sensor 12 acquires current position information of the inverted type mobile object 100A. The GPS sensor 12 is, for example, a part of a position information measuring system in which artificial satellites are used and precisely measures the position (latitude, longitude, and altitude) of the inverted type mobile object from any point on the earth by receiving radio waves from a plurality of GPS satellites. Note that, the inverted type mobile object 100A may be provided with an imaging device or a communication device.

Configuration of Personal Type Mobile Object

Figure 5:
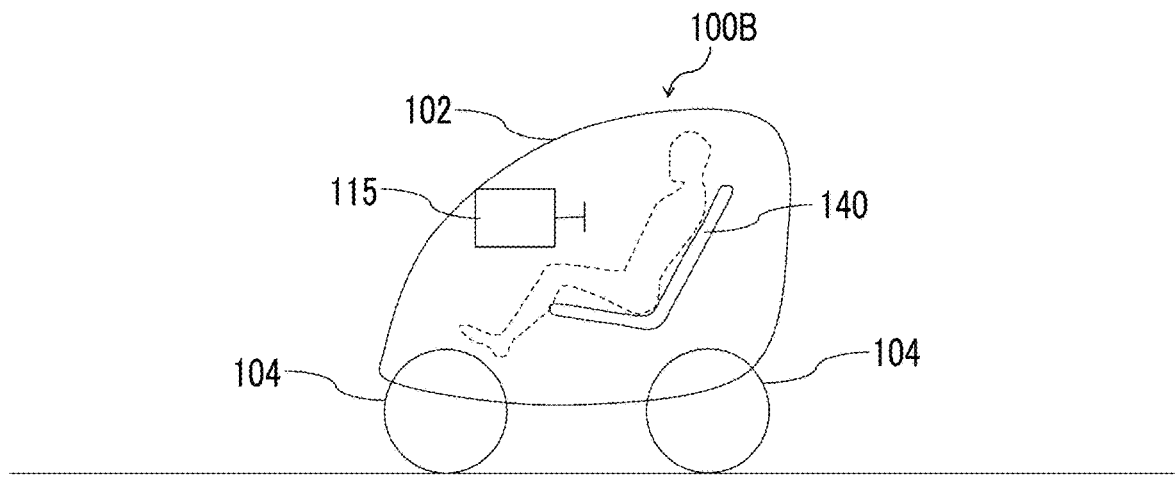
FIG. 5 is a view illustrating a schematic configuration of a personal type mobile object according to the embodiment.

FIG. 5 is a view illustrating a schematic configuration of a personal type mobile object according to the present embodiment. A personal type mobile object 100B according to the present embodiment is provided with, for example, a vehicle main body 102, a seat unit 140 that is attached to the vehicle main body 102 and that an occupant (drivers) sits on, an operation unit 115 that the occupant holds and with which the occupant can drive the personal type mobile object 100B, and a pair of right and left drive wheels 104 that is rotatably attached to the vehicle main body 102.

The personal type mobile object 100B according to the present embodiment is, for example, a small size vehicle with a seat for one person or two persons and a configuration in which two drive wheels 104 are provided on a front side and one drive wheel 104 is provided on a rear side may also be adopted. Movement of the personal type mobile object 100B may be controlled by a driver operating the personal type mobile object 100B and the personal type mobile object 100B may enter an autonomous travel mode such that autonomous travel thereof is controlled based on images captured by an imaging device 170 or a plurality of sensors.

Figure 6:
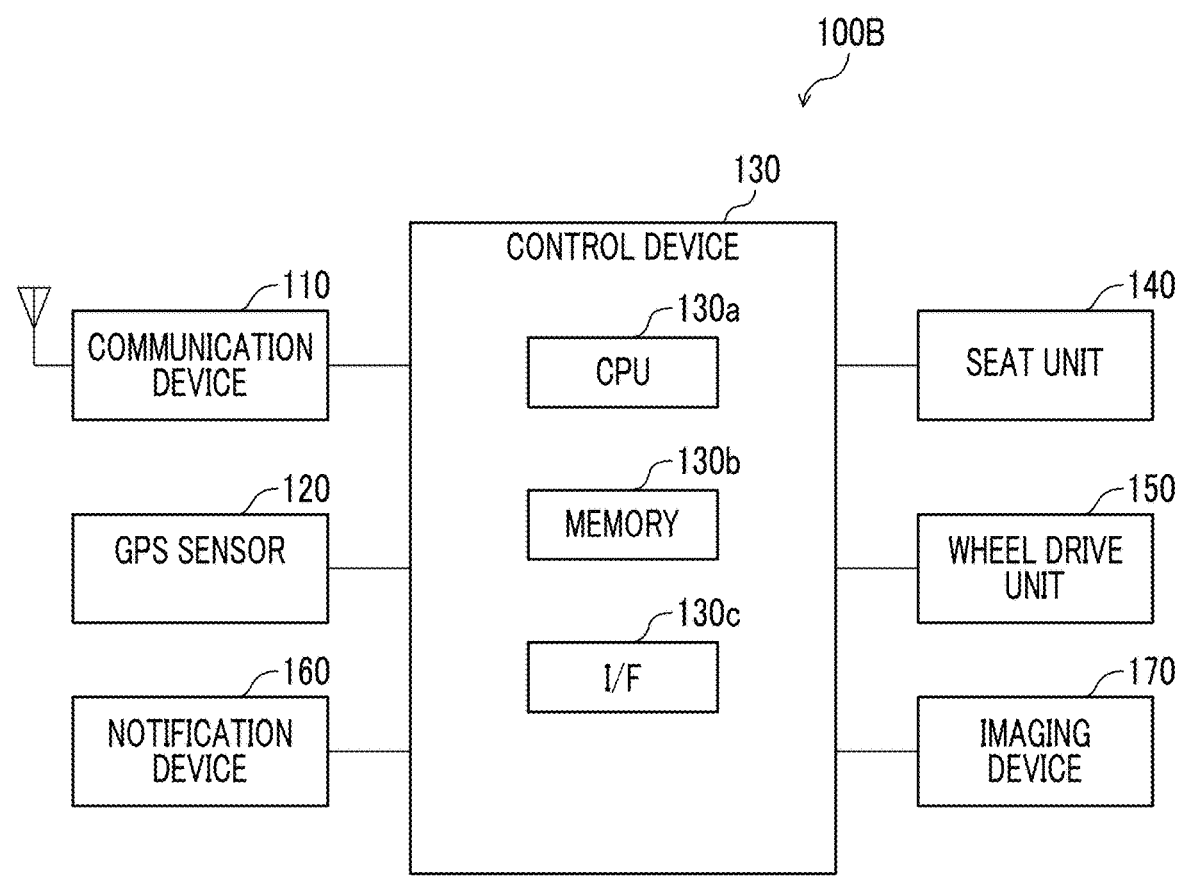
FIG. 6 is a block diagram illustrating a schematic system configuration of the personal type mobile object according to the embodiment.

FIG. 6 is a block diagram illustrating a schematic system configuration of the personal type mobile object according to the present embodiment. The personal type mobile object 100B according to the present embodiment is provided with a pair of wheel drive units 150 that drives the drive wheels 104, the seat unit 140 that the occupant can sit on, a communication device 110 that can communicate with an external device, the operation unit 115 with which the occupant can perform a driving operation, a GPS sensor 120 that acquires position information, a notification device 160 that can output sound data or display data, and the imaging device 170 that captures an image.

The GPS sensor 120 acquires current position information of the personal type mobile object 100B. The GPS sensor 120 is, for example, a part of a position information measuring system in which artificial satellites are used and precisely measures the position (latitude, longitude, and altitude) of the personal type mobile object from any point on the earth by receiving radio waves from a plurality of GPS satellites.

A control device 130 generates and outputs a control signal for driving and controlling the wheel drive units 150 based on detection values of various sensors installed in the personal type mobile object 100B and the contents of an operation performed by the occupant using the operation unit 115.

In order to realize various processes, the control device 130 includes a CPU 130a, a memory 130b, and an I/F 130c. The CPU 130a performs a function and/or a method realized by a code or a command included in a program stored in the memory 130b.

The memory 130b stores the program and provides a work area for the CPU 130a. Various kinds of data that are generated while the CPU 130a is executing the program are also temporarily stored in the memory 130b. Examples of the memory 130b include a random access memory (RAM), a read only memory (ROM), or the like.

The I/F 130c includes an input device used to input various operations with respect to the control device 130 and an output device that outputs the result of a process performed by the control device 130.

The seat unit 140 is a seat unit that the occupant sits on and may be configured to be able to be reclined.

The wheel drive units 150 are built into the vehicle main body 102 and drive the pair of right and left drive wheels 104 and the one drive wheel 104 on the rear side, respectively.

The notification device 160 is a specific example of notification means. The notification device 160 notifies the occupant or a person on the outside of the vehicle about predetermined information in accordance with a notification signal from the control device 130. The notification device 160 may be configured to include a speaker, which outputs a sound, or the like.

The imaging device 170 is provided at a position such that the imaging device 170 captures an image of a space ahead of the personal type mobile object 100B. The imaging device 170 outputs the captured image, which is obtained by capturing the image of the space ahead of the personal type mobile object 100B, to the control device 130.

Hereinafter, the inverted type mobile object 100A and the personal type mobile object 100B are collectively referred to as small size vehicles or personal mobility vehicles and description on the small size vehicle will be made while using the personal type mobile object 100B while the inverted type mobile object 100A may also be used.

Functional Configuration

Figure 7:
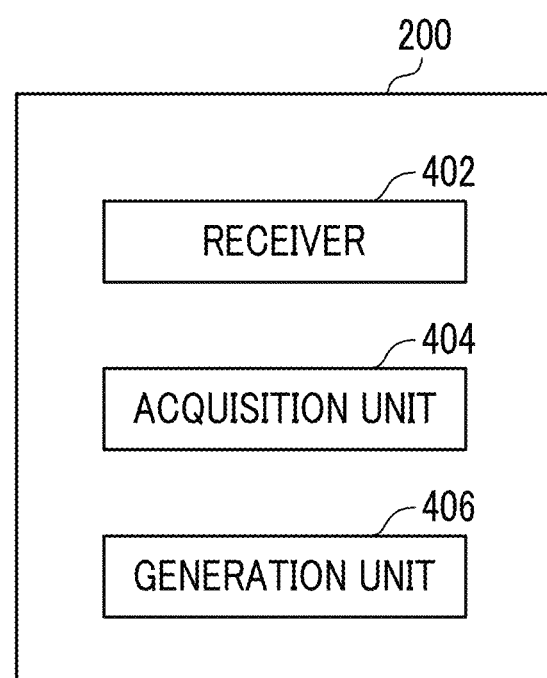
FIG. 7 is a block diagram illustrating a functional configuration of the information processing device according to the embodiment.

FIG. 7 is a block diagram illustrating a functional configuration of the information processing device 200 according to the present embodiment. The information processing device 200 shown in FIG. 7 includes a receiver 402, an acquisition unit 404, and a generation unit 406.

The receiver 402 shown in FIG. 7 may be realized by, for example, the communication I/F 210 shown in FIG. 2 and the acquisition unit 404 and the generation unit 406 may be realized by, for example, the processor 202 and the memory 204 as a work area, which are shown in FIG. 2.

The receiver 402 receives the emergency signal transmitted from the master device 300. The emergency signal is, for example, an emergency earthquake prompt report, a typhoon prompt report, a heavy rainfall prompt report, or the like. The master device 300 can predict whether an earthquake or a seismic sea wave will occur or not based on information acquired from a sensor such as a seismometer and generate the emergency signal in a case where the master device 300 predicts that there will be significant damage. Emergency situation prediction may be performed by another device and an operator may manually make an instruction about occurrence of an emergency situation. Note that, the small size vehicle may also receive the emergency signal. In addition, the emergency signal includes area information for specifying a disaster area.

The acquisition unit 404 acquires traveling data from a predetermined small size vehicle in a case where the emergency signal is received. The predetermined small size vehicle is, for example, a small size vehicle that is registered in the information processing device 200 in advance. The registered small size vehicle is assigned a vehicle ID and the information processing device 200 can specify the kind of the vehicle, the model year of the vehicle, or the like based on the vehicle ID. The acquisition unit 404 may acquire vehicle IDs as well when acquiring the traveling data from a plurality of small size vehicles. Note that, the traveling data is also referred to as traveling history data, probe data, and the like.

The generation unit 406 generates, based on the traveling data acquired by the acquisition unit 404, map information indicating a passable route passable for a person. The generation unit 406 acquires base map information from, for example, Google Maps (registered trade mark) and superimposes the above-described traveling data on the base map information. For example, even when a road is blocked due to a disaster, in a case where a vacant lot or a park beside the road is passable for a small size vehicle, the road is displayed in the map information as a passable route. Accordingly, it is possible to create map information indicating a route passable for a person and thus it is possible to utilize the map information as evacuation information at the time of a disaster.

In addition, the generation unit 406 may specify a disaster area based on the emergency signal and may generate map information indicating a route passable for a person by using traveling data from a small size vehicle present in the disaster area. For example, the generation unit 406 specifies a disaster area based on the area information included in the emergency signal and determines whether a small size vehicle is present in the disaster area based on current position information of the small size vehicle. Accordingly, a processing load can be reduced since an area in which a route passable for a person is needed is specified and map information indicating a passable route in the area is generated.

In addition, the generation unit 406 updates the passable route in the disaster area each time the traveling data is acquired from the small size vehicle. For example, the small size vehicle may transmit the traveling data to the information processing device 200 periodically. The meaning of "periodically" may be "at intervals of several milliseconds", "at intervals of several seconds", "at intervals of several minutes", or the like. Accordingly, it is possible to update the passable route for a person in real time at the time of a disaster at which there is no moment to lose.

In addition, the small size vehicles may include a plurality of different types of small size vehicles. For example, a first small size vehicle may be an inverted type mobile object and a second small size vehicle may be a personal type mobile object. At this time, the generation unit 406 may generate the map information such that a first passable route based on traveling data of the first small size vehicle and a second passable route based on traveling data of the second small size vehicle can be distinguished from each other. Accordingly, a user can figure out which type of small size vehicle can pass through a route by seeing the map information and to use the information as reference at the time of evacuation.

Map Information Generation Process

Figure 8:
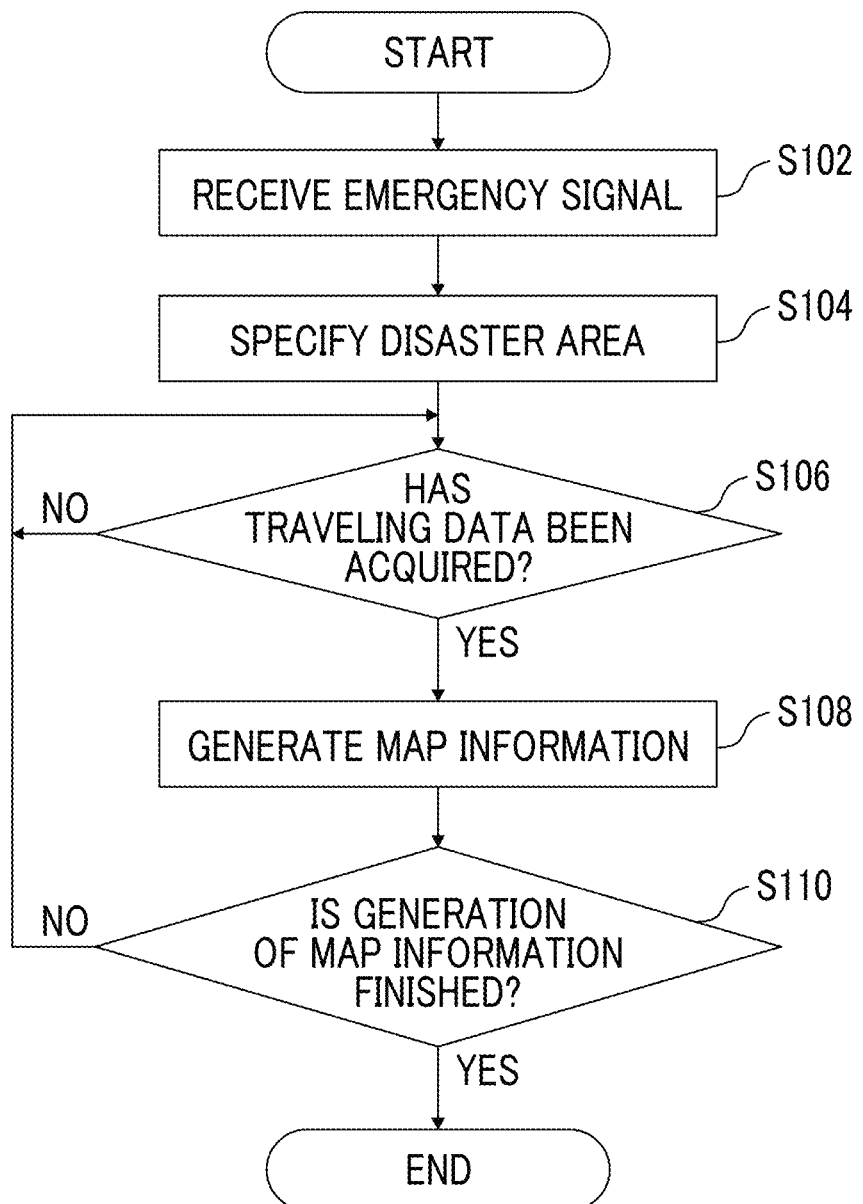
FIG. 8 is a flowchart illustrating an example of a map information generation process according to the embodiment.

Next, an operation of generating map information which is performed by the information processing device according to the present embodiment will be described. FIG. 8 is a flowchart illustrating an example of a map information generation process according to the present embodiment. In the example shown in FIG. 8, the receiver 402 receives the emergency signal transmitted from the master device 300 in step S102, for example.

In step S104, the generation unit 406 acquires the area information from the emergency signal and specifies a disaster area.

In step S106, the acquisition unit 404 determines whether the traveling data has been acquired from a predetermined small size vehicle or not. In a case where the acquisition unit 404 has acquired the traveling data, the process proceeds to step S108 and in a case where the acquisition unit 404 has not acquired the traveling data, the process returns to step S106.

In step S108, the generation unit 406 generates the map information indicating a route passable for a person based on the traveling data acquired from the small size vehicle.

In step S110, the generation unit 406 determines whether generation of the map information is finished or not. It is possible to determine whether generation of the map information is finished or not based on whether a predetermined period of time has elapsed or not after occurrence of a disaster. In a case where the generation of the map information is not finished, the process returns to step S106 and in a case where the generation of the map information is finished, the process is terminated.

Accordingly, it is possible to create map information indicating a route passable for a person and thus it is possible to utilize the map information as evacuation information at the time of a disaster. The generated map information can be open to the public via a website or can be distributed via a predetermined application.

Specific Example

Figure 9:
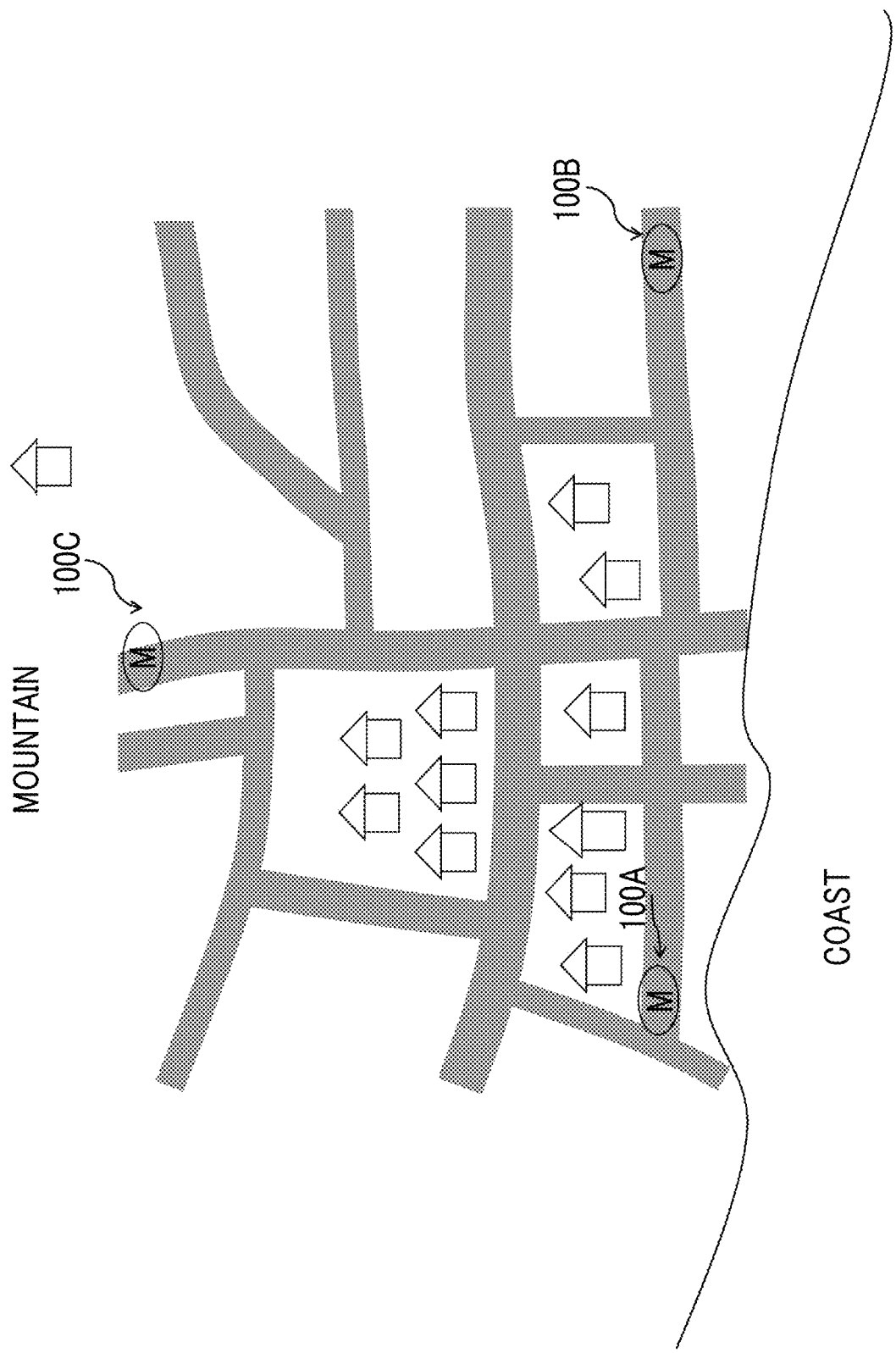
FIG. 9 is a diagram illustrating a situation at the time of a disaster.

Next, a specific example of the map information generation process according to the present embodiment will be described by using FIGS. 9 to 14. FIG. 9 is a diagram illustrating a situation at the time of a disaster. In an example shown in FIG. 9, the small size vehicle 100A is traveling along a road in a residential section near a coast, the small size vehicle 100B is traveling in a non-residential section near the coast, and the small size vehicle 100C is traveling at a mountain. The following description will be made on an assumption that the information processing device 200 has received the emergency signal related to this area in a state as shown in FIG. 9. In addition, when the emergency signal is received, each small size vehicle starts to transmit host vehicle traveling data to the information processing device 200. In addition, the small size vehicles may transmit the host vehicle traveling data to the information processing device 200 by default. In this case, intervals at which the traveling data is transmitted may be shortened when the emergency signal is received.

Figure 10:
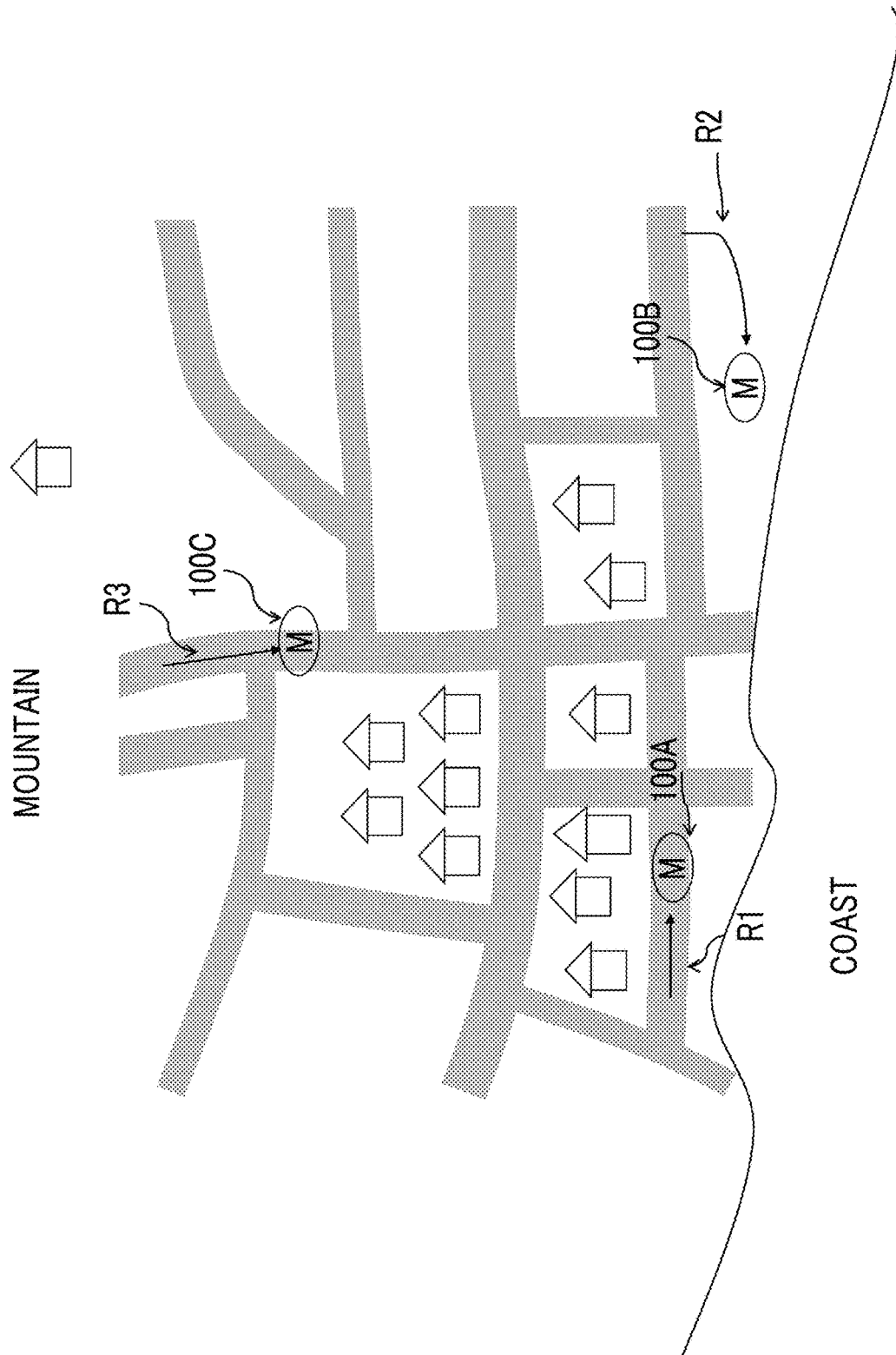
FIG. 10 is a diagram illustrating a state where a predetermined period of time A has elapsed after occurrence of the disaster.

FIG. 10 is a diagram illustrating a state where a predetermined period of time A has elapsed after occurrence of the disaster. It can be found that each of the small size vehicles is continuing to travel in an example shown in FIG. 10. Traveling data R1 indicates traveling history data of the small size vehicle 100A, traveling data R2 indicates traveling history data of the small size vehicle 100B, and traveling data R3 indicates traveling history data of the small size vehicle 100C. The traveling data R2 shows that the small size vehicle 100B is traveling through a space other than an existing road since the road is blocked.

Figure 11:
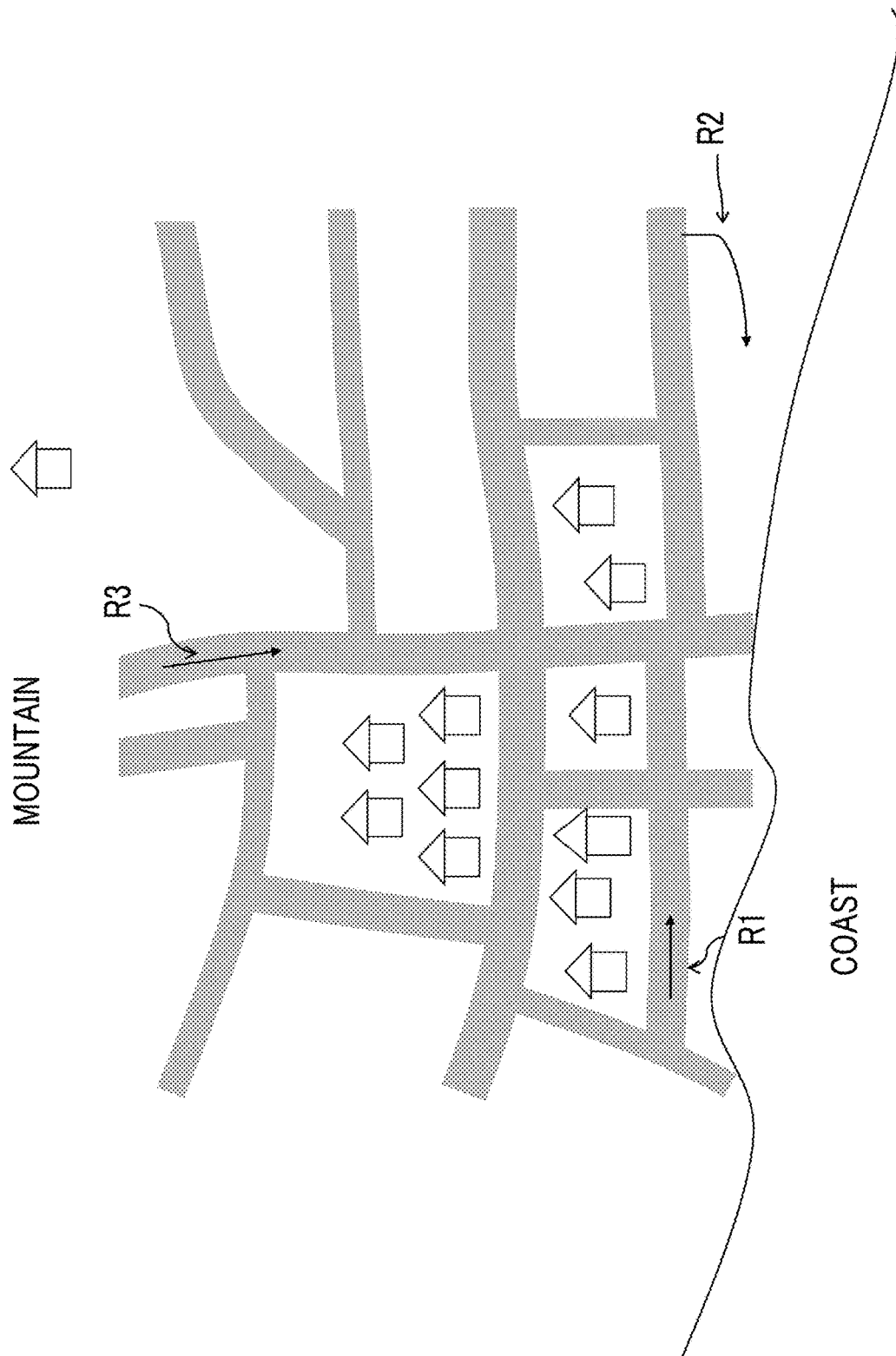
FIG. 11 is diagram illustrating an example of map information after the passage of the predetermined period of time A.

FIG. 11 is diagram illustrating an example of the map information after the passage of the predetermined period of time A. In the example shown in FIG. 11, the acquisition unit 404 of the information processing device 200 acquires the traveling data R1 from the small size vehicle 100A, acquires the traveling data R2 from the small size vehicle 100B, and acquires the traveling data R3 from the small size vehicle 100C. The generation unit 406 of the information processing device 200 generates map information shown in FIG. 11 based on the traveling data R1, R2, R3. Each of the traveling data R1, R2, R3 shown in FIG. 11 shows a route passable for a person.

Figure 12:
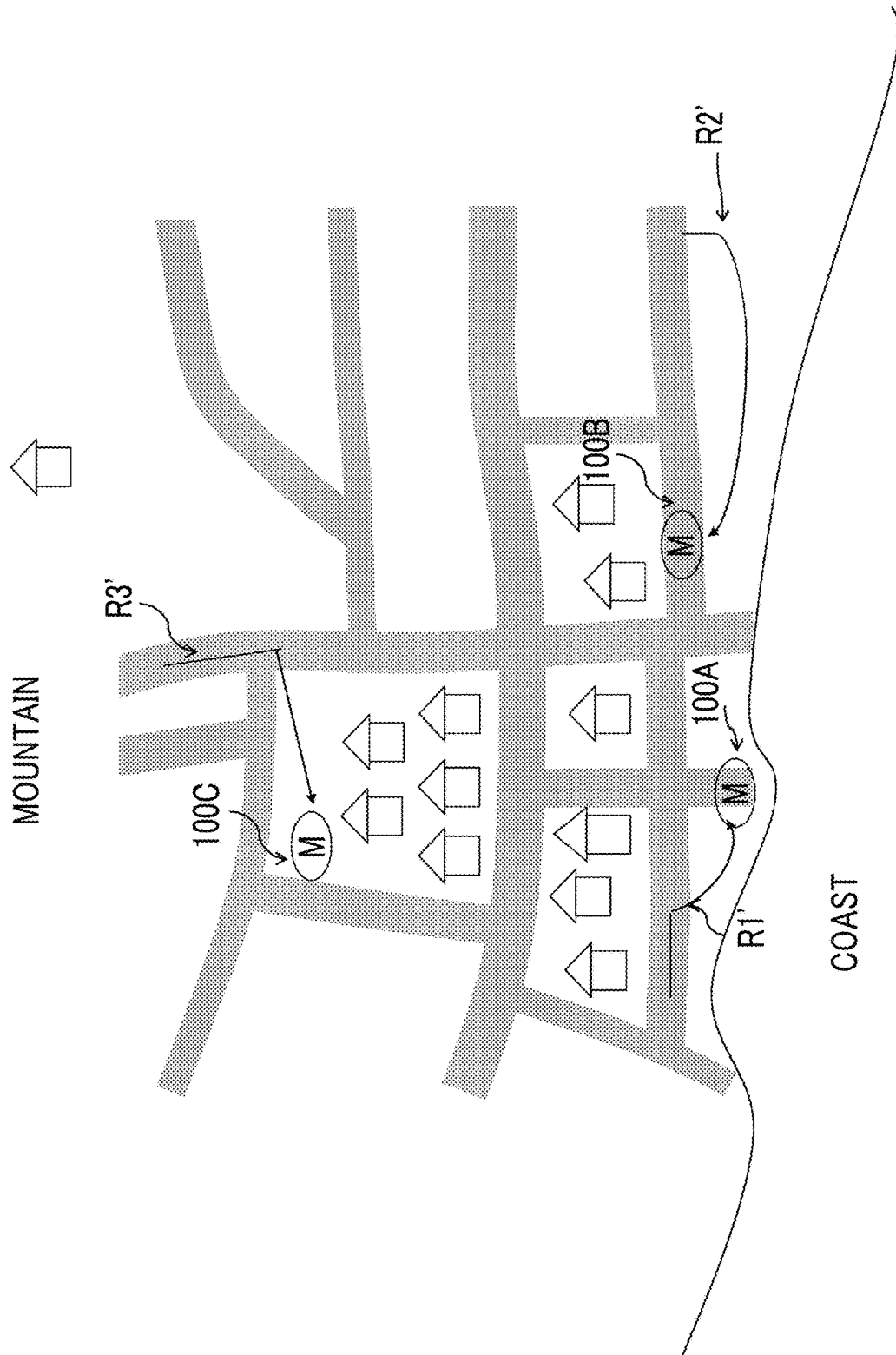
FIG. 12 is a diagram illustrating a state where a predetermined period of time B has elapsed after the occurrence of the disaster.

FIG. 12 is a diagram illustrating a state where a predetermined period of time B has elapsed after the occurrence of the disaster. The predetermined period of time B is longer than the predetermined period of time A. It can be found that each of the small size vehicles is still continuing to travel in an example shown in FIG. 12. Traveling data R1' indicates traveling history data of the small size vehicle 100A, traveling data R2' indicates traveling history data of the small size vehicle 100B, and traveling data R3' indicates traveling history data of the small size vehicle 100C. The traveling data R1', R2', R3' show that each of the small size vehicles is traveling through a space other than an existing road outside the road.

Figure 13:
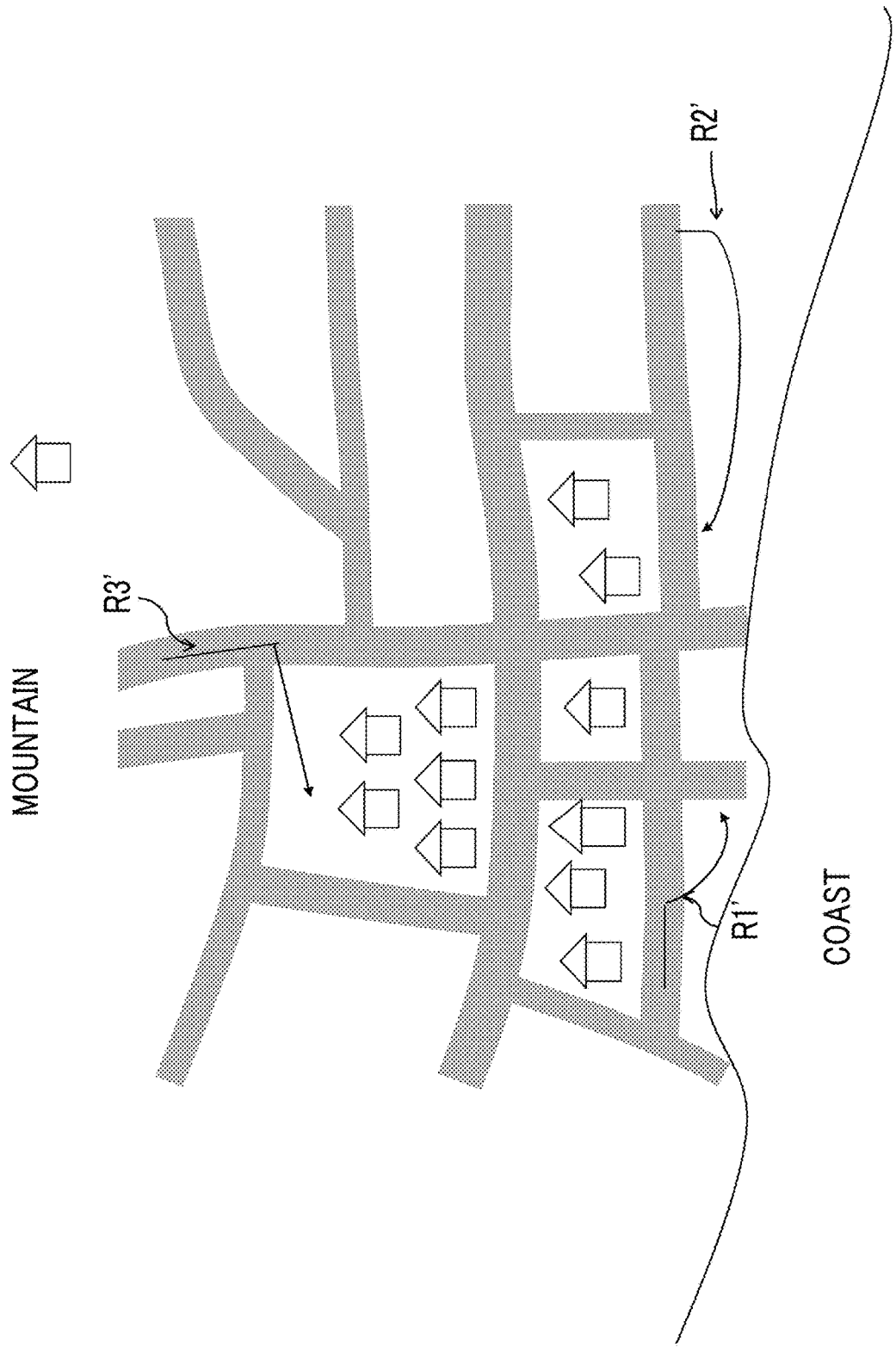
FIG. 13 is diagram illustrating an example of map information after the passage of the predetermined period of time B.

FIG. 13 is diagram illustrating an example of the map information after the passage of the predetermined period of time B. In the example shown in FIG. 13, the acquisition unit 404 of the information processing device 200 acquires the traveling data R1' from the small size vehicle 100A, acquires the traveling data R2' from the small size vehicle 100B, and acquires the traveling data R3' from the small size vehicle 100C. The generation unit 406 of the information processing device 200 generates map information as shown in FIG. 13 based on the traveling data R1', R2', R3'. Each traveling data in FIG. 13 shows a route passable for a person. Accordingly, a person in the disaster area can evacuate while confirming which route is passable for the person. In addition, a rescuer also can figure out which route leads to a person to be rescued.

Figure 14:
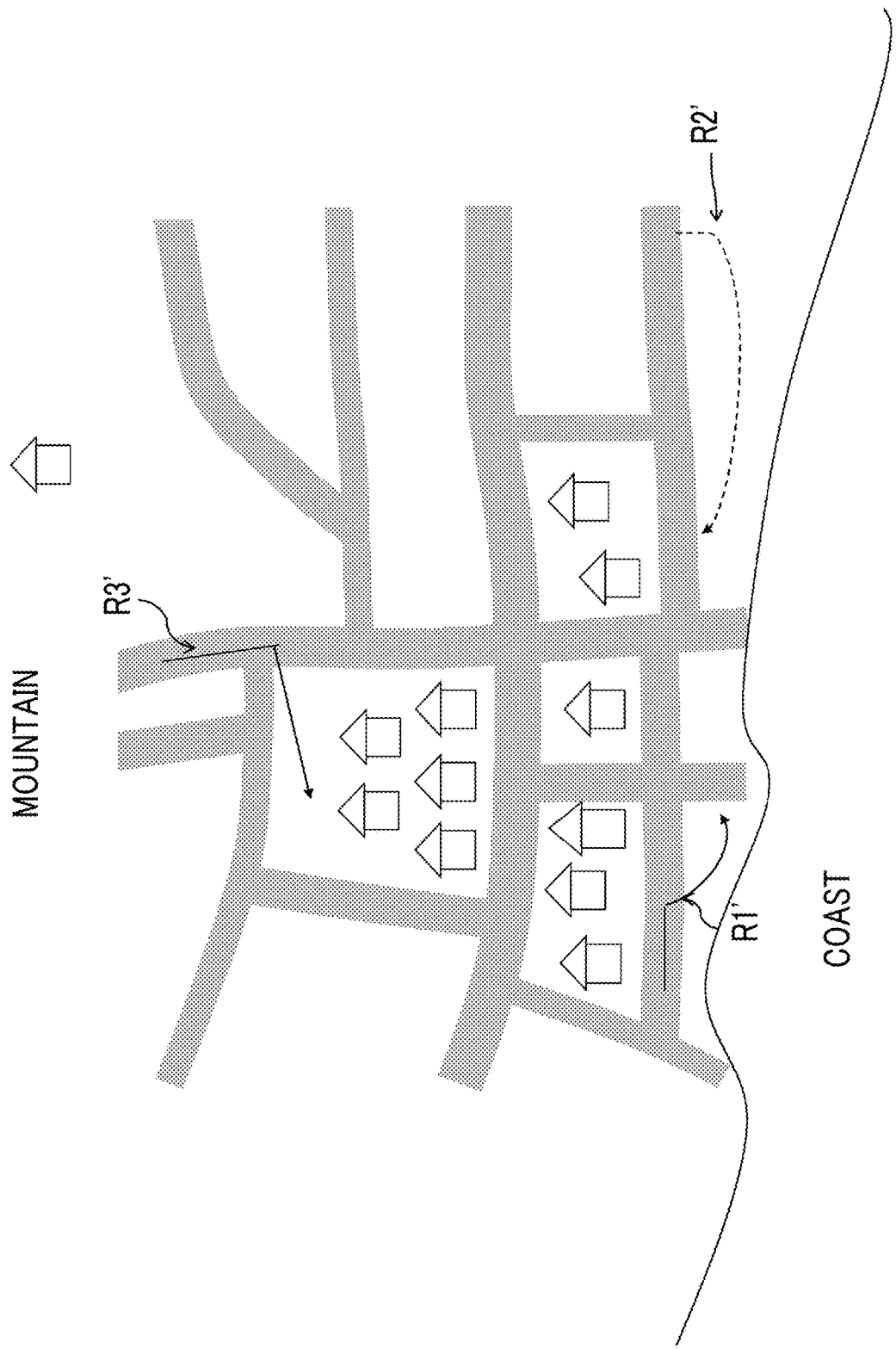
FIG. 14 is a diagram illustrating the map information in which passable routes can be distinguished by types of small size vehicles.

FIG. 14 is a diagram illustrating the map information in which the passable routes can be distinguished by types of small size vehicles. In an example shown in FIG. 14, the small size vehicle 100B is a personal type mobile object and the small size vehicles 100A, 100C are inverted type mobile objects. At this time, as shown in FIG. 14, the generation unit 406 generates the map information such that routes R1', R3' can be distinguished from a route R2'. For example, the generation unit 406 makes the colors, thicknesses, or types (solid line, dotted line, or like) of lines indicating the routes different such that the routes can be distinguished from each other. Accordingly, it is possible to distinguish routes passable for a person in more detail in accordance with the sizes or the like of the small size vehicles.

Modification Example

In a modification example of the above-described embodiment, the processes described in the embodiment may be combined with each other or any of the processes may not be provided. For example, a process of specifying a disaster area is not an essential process. In addition, if the small size vehicles can communicate with each other, a configuration, in which one of the small size vehicles becomes a master vehicle and receives non-host vehicle traveling data from the other small size vehicles such that the master small size vehicle generates map information including a route passable for a person, may also be adopted. At this time, the master small size vehicle includes the receiver 402, the acquisition unit 404 and the generation unit 406 shown in FIG. 7. The generation unit 406 of the small size vehicle generates the map information including a route passable for a person based on host vehicle traveling data and the non-host vehicle traveling data.

What is claimed is:

1. An information processing device comprising:
  a receiver configured to receive an emergency signal indicating occurrence of a disaster; and
  a processor programed to
    specify a disaster area based on the emergency signal;
    periodically acquire traveling data from a first predetermined vehicle disposed in the disaster area in a case where the emergency signal is received, the first predetermined vehicle being a personal mobility vehicle, the traveling data including a traveled route that the first predetermined vehicle has traveled on, and the traveled route including an area other than an existing road;
    generate map information indicating a first passable route passable for a person based on the traveling data, the first passable route including the traveled route; and
    update the map information each time the traveling data is acquired such that the map information is updated in real time.

2. The information processing device according to claim 1, wherein processor is programed to generate the map information based on traveling data acquired from a plurality of predetermined vehicles such that (i) the first passable route based on the traveling data of the first predetermined vehicle and (ii) a second passable route based on traveling data of a second predetermined vehicle different from the first predetermined vehicle are distinguishable from each other in a case where the plurality of predetermined vehicles include the first predetermined vehicle and the second predetermined vehicle.

3. A non-transitory computer readable storage medium storing a program, the program causing a computer to:
  receive an emergency signal indicating occurrence of a disaster;
  specify a disaster area based on the emergency signal;
  periodically acquire traveling data from a predetermined vehicle disposed in the disaster area in a case where the emergency signal is received, the first predetermined vehicle being a personal mobility vehicle, the traveling data including a traveled route that the first predetermined vehicle has traveled on, and the traveled route including an area other than an existing road;
  generate map information indicating a passable route passable for a person based on the traveling data, the passable route including the traveled route; and
  update the map information each time the traveling data is received such that the map information is updated in real time.

4. A vehicle comprising:
  a receiver configured to receive an emergency signal indicating occurrence of a disaster; and
  a processor programed to
    specify a disaster area based on the emergency signal;
    periodically acquire non-host vehicle traveling data from another vehicle that is a predetermined vehicle disposed in the disaster area in a case where the emergency signal is received, the first predetermined vehicle being a personal mobility vehicle, the traveling data including a traveled route that the first predetermined vehicle has traveled on, and the traveled route including an area other than an existing road;
    generate map information indicating passable route passable for a person based on host vehicle traveling data and the non-host vehicle traveling data, the passable route including the traveled route; and
    update the map information each time the traveling data is received such that the map information is updated in real time.

* * * * *